United States Patent [19]

Moody

[11] Patent Number: 4,785,154
[45] Date of Patent: Nov. 15, 1988

[54] METHOD AND APPARATUS FOR JOINING TOGETHER THE ENDS OF A METALLIC BAND BY RESISTANCE INERT GAS WELDING

[75] Inventor: Jack M. Moody, Milwaukie, Oreg.

[73] Assignee: Cranston Machinery Co., Inc., Milwaukie, Oreg.

[21] Appl. No.: 51,634

[22] Filed: May 20, 1987

[51] Int. Cl.[4] .............................................. B23K 11/00
[52] U.S. Cl. .................................. 219/78.01; 219/57; 219/58; 219/104; 219/103
[58] Field of Search ..................................... 219/56–58, 219/101, 103–105, 95–97, 78.01; 100/26

[56] References Cited

U.S. PATENT DOCUMENTS

| 2,409,652 | 10/1946 | Workman | 100/29 X |
|---|---|---|---|
| 2,614,487 | 10/1952 | Cheesman | 219/57 X |
| 2,708,228 | 5/1955 | Crabbe et al. | 219/57 |
| 2,721,921 | 10/1955 | Sheppard | 219/57 |
| 3,539,752 | 11/1970 | Ernst | 219/58 X |
| 3,767,885 | 10/1973 | Fryer | 219/56 |
| 4,314,131 | 2/1982 | Fryer | 219/58 |
| 4,536,637 | 8/1985 | Horiuchi et al. | 219/117.1 |

Primary Examiner—E. A. Goldberg
Assistant Examiner—Teresa J. Walberg
Attorney, Agent, or Firm—Lee R. Schermerhorn

[57] ABSTRACT

This method of electric welding metal band ends together comprises a fusion cycle with the introduction of inert gas, a cooling cycle with the introduction of cooling air, and an annealing cycle. The method is carried out in a fusion head having grippers to manipulate the band ends, and a control system for the grippers, inert gas, cooling air, welding and annealing currents and timing functions.

16 Claims, 8 Drawing Sheets

METHOD AND APPARATUS FOR JOINING TOGETHER THE ENDS OF A METALLIC BAND BY RESISTANCE INERT GAS WELDING

BACKGROUND OF THE INVENTION

This invention relates to an improved method and apparatus for joining together the ends of a metallic band by resistance inert gas welding.

In the binding or strapping of bales and other bundles of material, wire has long been used and for many years the normal method of joining the opposite ends of such wires together has been a twisted knot. This method has been acceptable for the most part but now under present conditions the conventional twisted wire joint is proving to be unsatisfactory.

The industry now requires a higher joint efficiency because it has become the practice to compress more bulk into smaller packages, resulting in higher stresses on the joints in the wires applied to retain the finished packages or bundles. Also, some of the products now being considered for wire binding exert continuous stress on the wire long after the packages or bundles have been released from the presses used to form them. A twisted wire joint, commonly referred to as a knot, has a tendency to untwist after being exposed to continuing stress.

For example, a sample wire may support a load of 3000 pounds. A twisted joint in the same wire may support a load of only 2700 pounds for a brief time. A twisted joint in the same wire under continuous stress will normally untwist and lose the ability to support a continuous load of only 1800 pounds for 24 hours.

Normally a high density package or bundle is retained with several wires around it to withstand the forces applied by the internal expansion of the package. If any of these wires fail to support their share of the load the remaining wires are subjected to an increased stress beyond their capacity and soon all the joints have failed.

Welded wire joints have heretofore been proposed for such purposes but have not proved to be successful, mostly because of the chemical properties of high tensile steels having a high carbon content along with other alloys that resist normal welding techniques. Oxidation of the metal during welding is a major cause of joint failure owing to improper or inconsistent annealing after welding. The most common failures occur in the metal immediately adjacent to the weld or in the weld joint itself.

SUMMARY OF THE INVENTION

In the present method, the joining of wire ends occurs within a shield of inert gas applied to the weld area during welding. This produces a fused joint that is actually stronger than the wire in its original state.

The present method also includes improvements in the cooling and annealing cycles which reduce the time for the whole operation and make it more efficient. Most important, the present method allows the use of high strength high carbon steel wire or flat band for greater security for whatever purpose it is used.

This method also results in improved safety, substantially eliminating fire hazard from sparks and hot molten metal flashing about during the fusion and annealing cycles.

The present fusion method provides the strongest wire joints available. This type of joint saves several inches of wire used in a conventional twisted joint. The location of the joint is no longer an important factor from the wire removal standpoint. All the wires that are applied to bales or bundles must be removed at some time and the twisted knot is usually the most unmanageable section in the wire. The location of the present fused joint can be found only by close inspection of the wire.

The present fused joint is also beneficial in other applications where fused joints have not been considered in the past. For example, the joint strength is enhanced in splicing bandsaw blades and other flat metal bands.

The present apparatus is adaptable to replace the knotter heads in the following prior patents relating to wire strapping machines: U.S. Pat. Nos. 3,179,037; 3,387,556; 4,403,542 and 4,611,534.

The invention will be better understood and additional features and advantages will become apparent from the following description of the preferred embodiment illustrated in the accompanying drawings. Various changes may be made in the details of construction and arrangement of parts and certain features may be used without others. All such modifications within the scope of the appended claims are included in the invention.

DESCRIPTION OF THE PREFERRED EMBODIMENT

Figures 1, 3, 4, 5, 6:
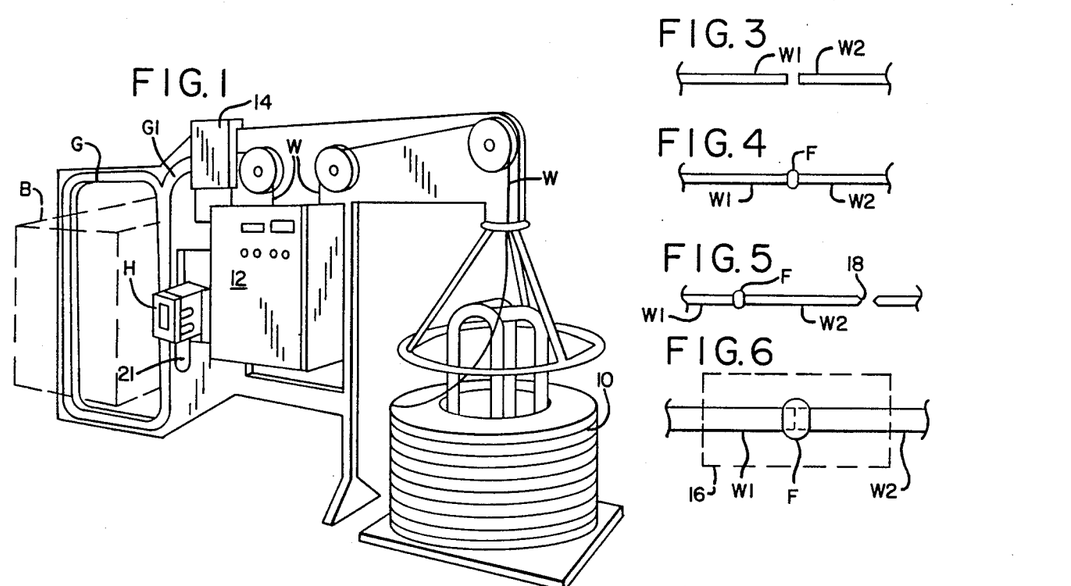
FIG. 1 is a perspective view showing how the present mechanism is applied to replace the usual knotter in a wire strapping machine.
FIG. 3 shows the relative positions of the wire ends before welding.
FIG. 4 shows the welded joint.
FIG. 5 shows the typical result of a test of the welded joint.
FIG. 6 shows the area subject to inert gas environment during welding.

FIG. 1 shows how the present fusion head H is substituted for the knotter mechanisms in the bale strapping machines illustrated in the prior patents referred to above. As explained in those patents a binding wire W is drawn from a wire coil supply source 10 through a wire takeup stand assembly 12 by a wire feed and tensioning mechanism 14. This wire feed mechanism pushes the leading end of the wire through a downwardly curved entrance guide track G1 into a guide track G which encircles the bale B to be bound.

In its downward passage through the near side of guide track G in the previous strapping machines the wire passes through a knotter mechanism and around the guide track G in clockwise direction for a second passage through the knotter mechanism. Wire feed 14 then reverses, stripping the loop of wire from guide track G and tensioning the loop about the bundle B. The wire thus retracted from the loop is returned to the slack takeup stand 12.

Then a cutter adjacent the knotter mechanism cuts off the wire forming a trailing end overlapping the leading end of the loop. The knotter mechanism then twists these overlapping wire end portions together to complete the binding operation.

In the present arrangement the fusion head H is substituted for the knotter mechanism and after the wire has been cut to form a trailing end the leading end W1 and trailing end W2 are brought into alignment with each other as shown in FIG. 3. Then the ends are pressed together and electrically fusion welded together as indicated at F in FIG. 4. During the fusion phase of the welding operation an inert gas environment is introduced to area 16 around the weld as shown in FIG. 6.

This eliminantes the usual oxidation problem in welds and allows the use of high strength, high carbon wire which is ordinarily very difficult to weld. In testing conventional wire welds made without an inert gas environment they break apart at the weld. The present weld is stronger than the wire itself. When the same test is applied to the present weld, the wire invariably breaks at some distance from the weld F as indicated at 18 in FIG. 5.

This superioer weld strength is accomplished by performing the welding operation in a series of cycles. After the wire ends have been pressed together the inert gas environment is applied to the fusion area and the welding circuit is energized in a fusion cycle under the control of a timer. After a delay following the fusion cycle, a cooling cycle is initiated by the application of a flow of air at room temperature. The duration of the cooling cycle is controlled by a timer and following that is an annealing cycle also controlled by a timer. In the annealing cycle an annealing circuit is energized. Certain of the described functions are performed by grippers in the fusion head illustrated in the drawings.

Figure 7:
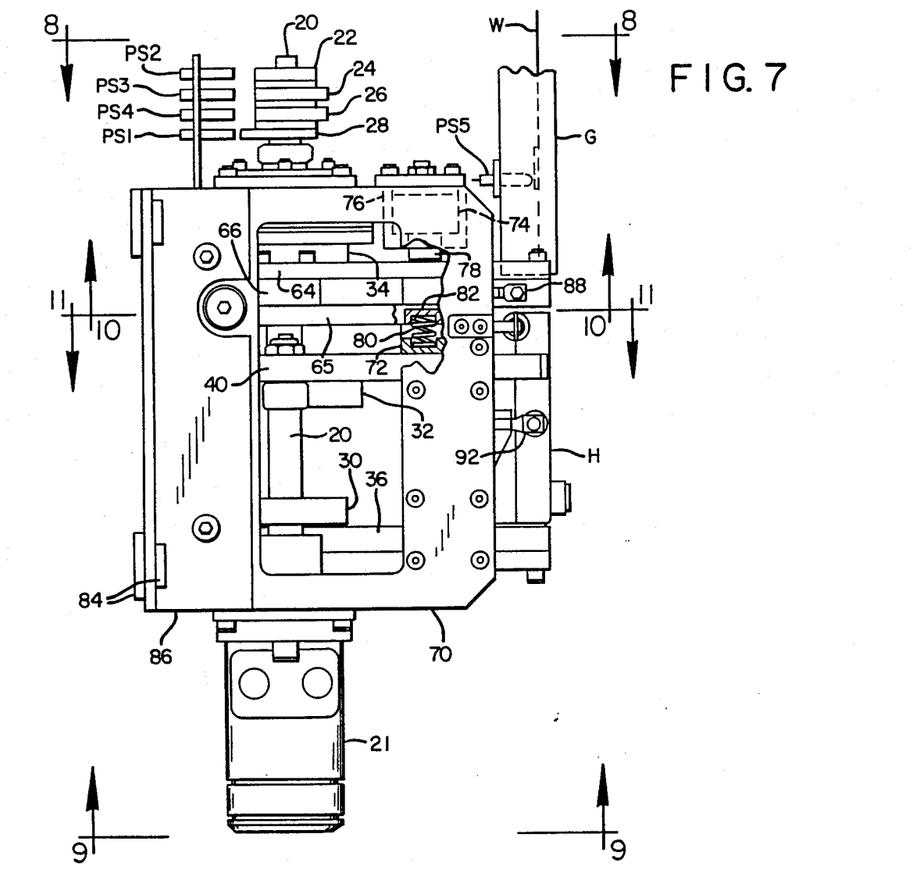
FIG. 7 is a side elevation view of the wire fusion head.
Figure 8:
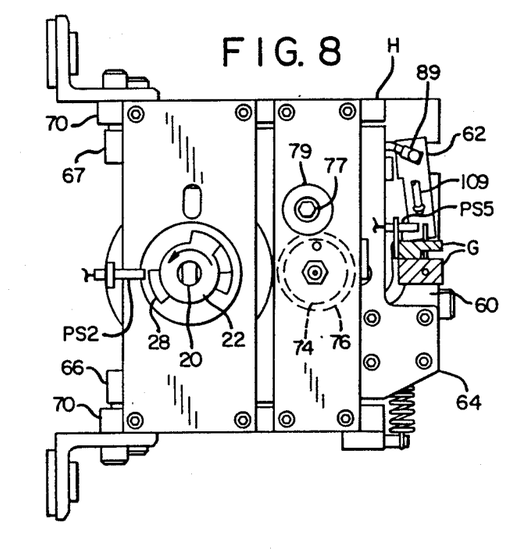
FIG. 8 is a top plan view on the line 8—8 in FIG. 7.
Figure 9:
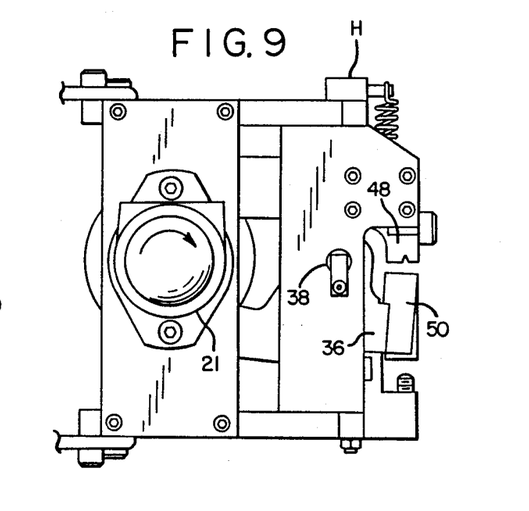
FIG. 9 is a bottom plan view on the line 9—9 in FIG. 7.

In FIG. 7 the fusion head H contains a cam shaft 20 rotated through small angles from time to time by hydraulic motor 21 at the lower end of the cam shaft. The upper end of the cam shaft carries a plurality of lobed discs 22, 24, 26 and 28 of magnetic material which actuate stationary proximity switches PS-1, PS-2, PS-3 and PS-4.

Figure 10:
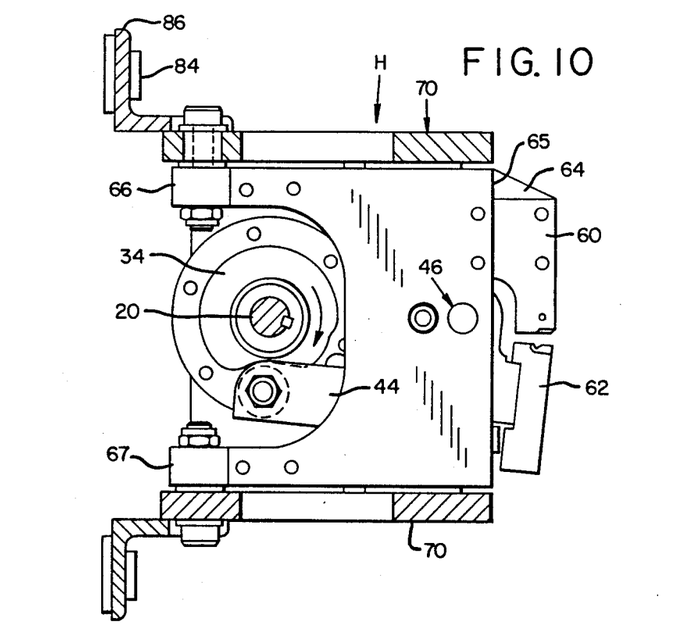
FIG. 10 is a sectional view on the line 10—10 in FIG. 7.
Figure 11:
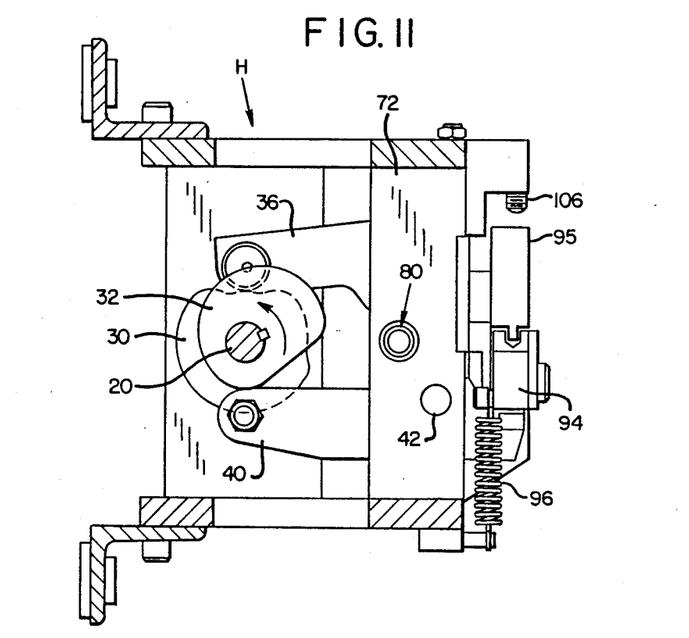
FIG. 11 is a sectional view on the line 11—11 in FIG. 7.
Figure 16:
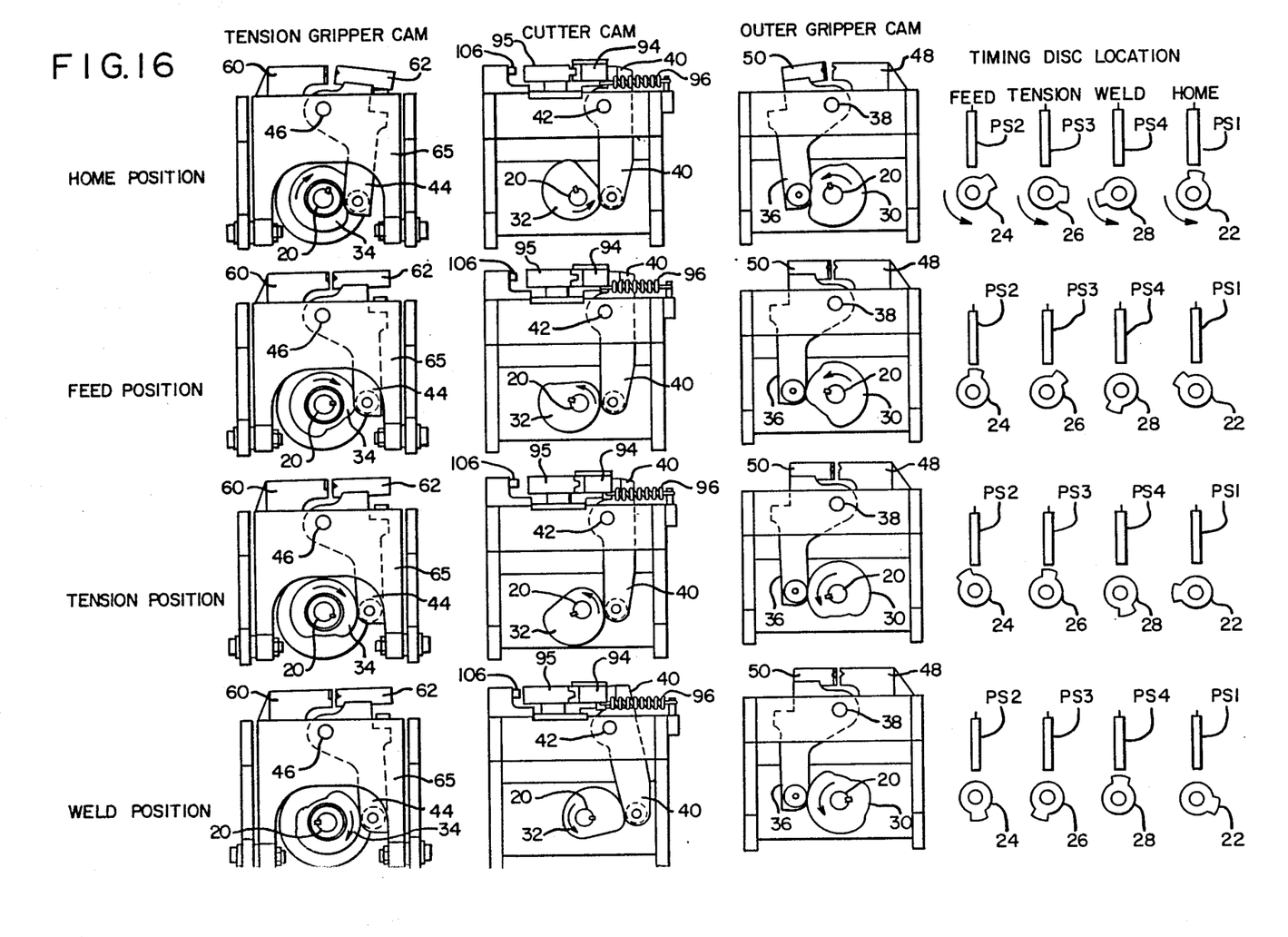
FIG. 16 contains sequence diagrams showing steps in the operation of the gripper and cutter cams and the operation of the cam shaft lobe discs for actuating four of the proximity switches.

Within the fusion head H cam shaft 20 carries an outer gripper cam 30 and a cutter cam 32 (See FIGS. 11 and 16) and a tension gripper cam 34 (See FIGS. 10 and 16). As indicated by the arrows in these views the cam shaft rotates in a counterclockwise direction viewed from its upper end and in a clockwise direction viewed from its lower end.

As best seen in FIG. 16 outer gripper cam 30 engages a cam follower on outer gripper arm 36 which is pivotally mounted at 38 in the fusion head H. Cutter cam 32 engages a cam follower on cutter arm 40 which is pivotally mounted at 42. Tension gripper cam 34 engages a cam follower on tension gripper arm 44 which is pivotally mounted at 46.

The outer gripper comprises a stationary gripper block 48 and a movable gripper block 50 on the gripper arm 36.

A cutter blade 94 and a movable cutter gripper block 95 are both actuated by the cutter arm 40. The cutter arm is retracted by spring 96.

The tension gripper comprises a stationary gripper block 60 and a movable gripper block 62 mounted on the tension gripper arm 44. These parts are mounted between movable upper side plates 64 and 65 as shown in FIGS. 7 and 10. Side plates 64 and 65 are supported by insulated pivot blocks 66 and 67 whereby these side plates and the tension gripper parts are insulated from the main frame 70.

Figure 13:
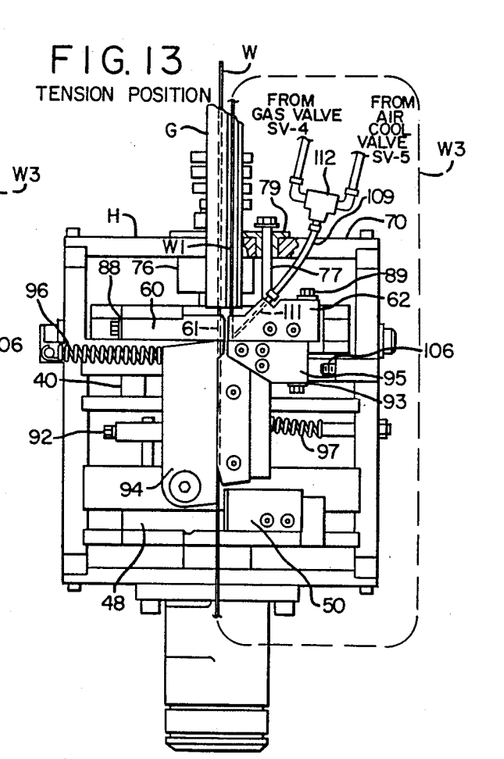

In order to press the ends of the wire together for welding, pivotal side plates 64 and 65 carrying the tension grippers 60 and 62, are pressed downward toward stationary lower side plate 72 by a piston 74 in a pneumatic cylinder 76. This piston engages an insulating pad 78 in upper side plate 64 and the downward movement is limited by adjustable stop bolt 77 in FIG. 13 which is insulated from main frame 70 by bushing 79.

When the pressure of piston 74 is relieved and gripper 62 is released, pivotal upper side plates 64 and 65 are pressed upward by return spring 80 which is insulated from plate 65 by an insulating cup 82 in FIG. 7.

Figure 12:
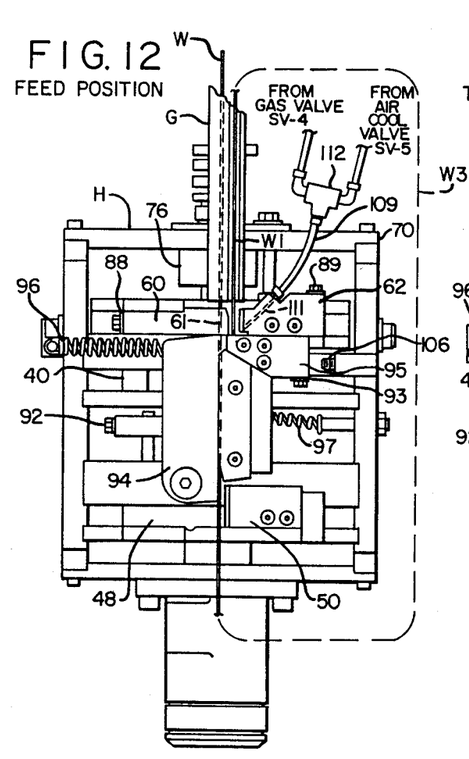
FIGS. 12, 13, 14 and 15 are front elevation views of the wire fusion head showing the operation of the grippers and cutter.

Fusion head main frame 70 is insulated from the strapping machine by insulating bushings 84 in its mounting brackets 86 in FIG. 10. As seen in FIG. 12 transformer leads 88 and 89 are connected to tension gripper parts 60 and 62, and transformer leads 92 and 93 are connected to cutter block 94 and wire stop 95.

In operation, the wire W is fed into and through the strapping machine in the same manner as in conventional wire strapping machines having knotters to secure the opposite ends of the wire loop together. Thus in FIG. 1 the wire W is fed by the wire feed and tension mechanism 14 down through curved guide track G1, through the fusion head H, around the guide track G surrounding the bundle B and back to fusion head H.

Proximity switch PS-5 in FIG. 7 on guide track G senses the leading end of the wire after the wire has completed its travel through guide track G and makes its downward approach to wire stop 95 in the fusion head in FIG. 12. In FIG. 12 this leading end of the wire is designated W1 and the loop around the bundle is designated W3.

Figure 20:
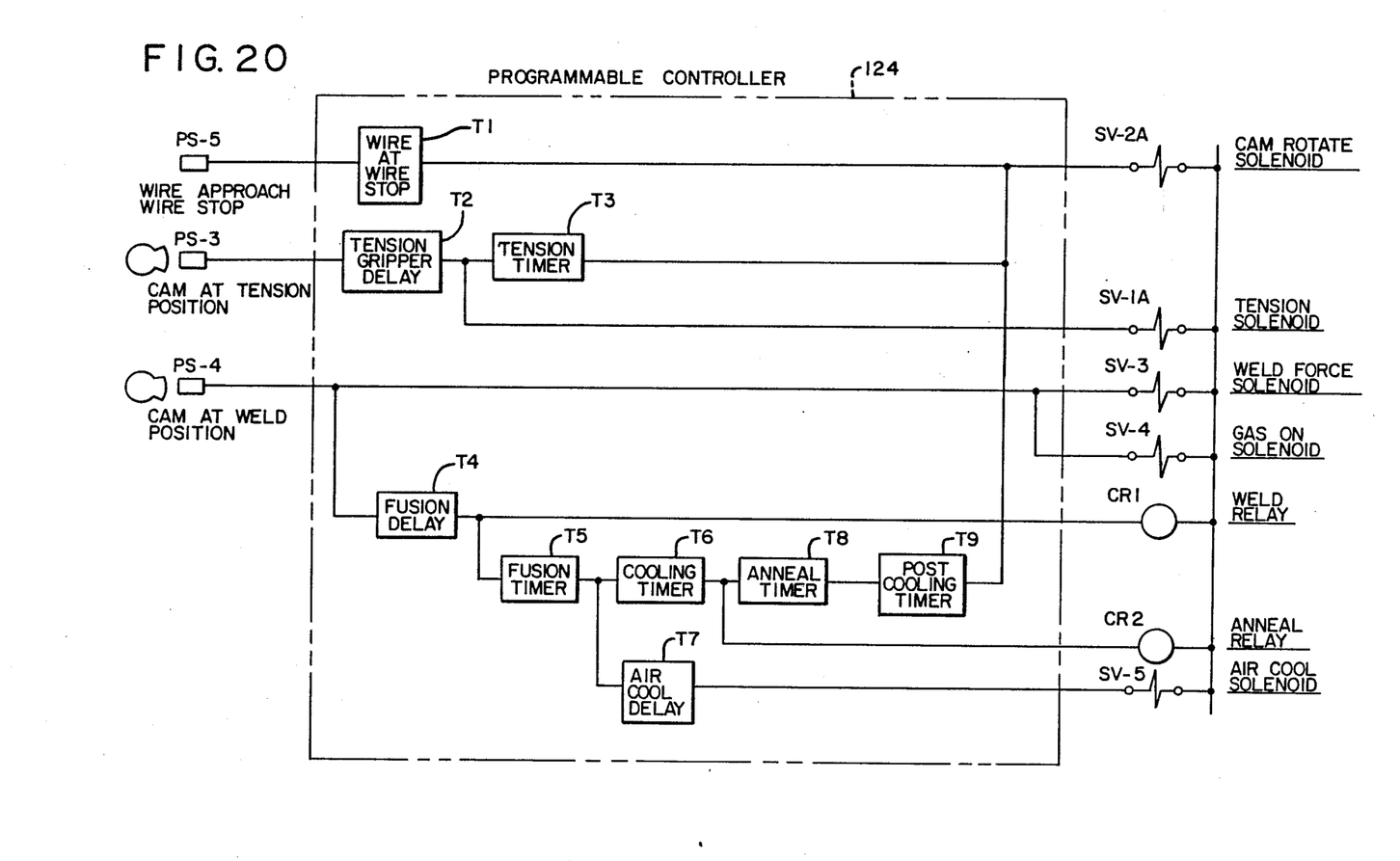
FIG. 20 is a timer interface chart of the fuse lock system.

The purpose of switch PS-5 is to start a timer T1 in FIG. 20 called the wire at wire stop. This timer controls the wire feed motor in wire feed mechanism 14 and causes it to stop when the leading end of the wire gets to the wire stop 95. This timer when timed out also signals, through solenoid valve SV-2A in FIG. 20, hydraulic motor 21 driving cam shaft 20 to rotate from the feed position in FIG. 16 to the tension position. Proximity switch PS-3 adjacent cam shaft 20 signals, through solenoid valve SV-1A in FIG. 20, hydraulic motor 21 to stop rotation of the cam shaft when it reaches the tension position.

The tension gripper delay timer T2 in FIG. 20 is started when the cam shaft reaches the tension position in FIG. 16. This timer provides a delay prior to tensioning to assure that the tension gripper 62 is fully closed. This is necessary so that the wire won't be pulled out of a partially closed gripper. The tension gripper delay timer T2 starts the wire tension cycle when it times out.

The tension timer T3 in FIG. 20 determines the time the tension drive motor in mechanism 14 in FIG. 1 runs. This is set slightly longer than it takes to complete the tensioning, to assure that the tension motor actually stalls out during tensioning.

Figure 14:
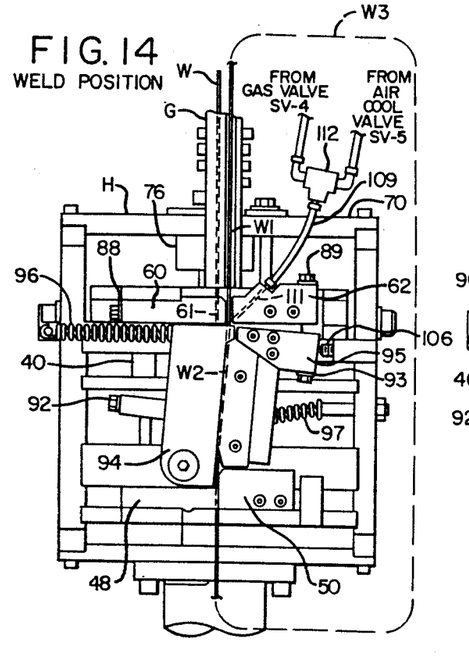
Figure 15:
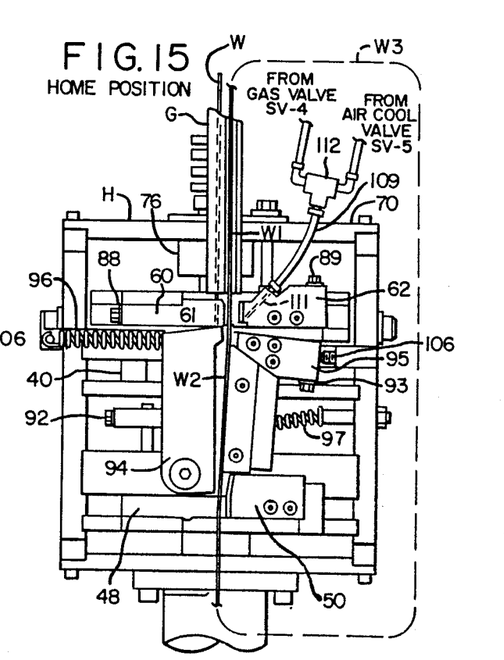

When the tension timer T3 times out, it signals the hydraulic motor 21 by way of solenoid valve SV-2A to rotate the cam shaft 20 again. As the cam shaft rotates through this segment from tension position to weld position in FIG. 16 cam 32 forces the cutter arm 40 into motion. During the cutter arm motion, the end of the wire passing through a hole 61 in the stationary gripper block 60 is cut by cutter block 94 to form trailing end W2 on loop W3 in FIG. 14.

The cutter arm 40 continues its motion until the trailing end W2 of the wire as cut is gripped tightly between the cutter block 94 and the wire stop 95 by contacting adjustment screw 106. This movement shifts the trailing end W2 into alignment with end W2 against the force of spring 97. It is this cutter, gripper combination that is connected to one side of the fusion transformer 91 in FIG. 19 by wires 92, 93.

The cam shaft rotation to its weld position in FIG. 16 is stopped by proximity switch PS-4. See FIG. 20. This proximity switch also turns on the inert gas through SV-4 in FIGS. 2 and 20 to purge the atmosphere from the fusion area through tube 109 in FIGS. 2 and 12. Tube 109 is connected to a hole 111 in gripper block 62 to form a nozzle for the gas.

When the cam shaft stopped at the weld position in FIG. 16, proximity switch PS-4 energized the solenoid valve SV-3 in FIG. 20 which feeds the weld force cylinder 76 in FIG. 7. This causes the aligned ends W1 and W2 of the wire to be forced together into the fusion position in FIG. 4. Fusion delay timer T4 in FIG. 20 is also started. This timer provides a delay to allow the ends of the wire to be tightly forced together prior to turning on the fusion current.

Figure 19:
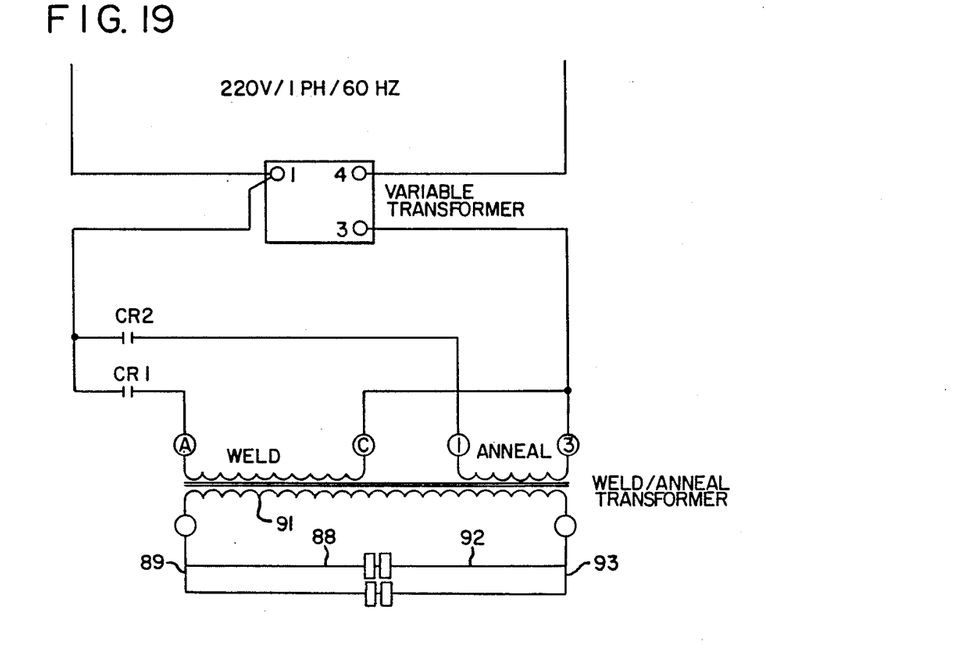
FIG. 19 is an electrical schematic diagram of the welding and annealing supply circuits.

When the fusion delay timer T4 times out, the welding current is turned on through relay CR-1 in FIGS. 19 and 20, and another timer is started. This timer, fusion timer T5 determines the duration of the fusion cycle.

During the fusion cycle, the ends W1 and W2 of the wire reach a molten temperature, and combined with the force applied by the force cylinder 76, the ends are fused together.

When the fusion timer T5 times out, it starts two other timers, one being the overall cooling timer T6 (cooling cycle), the other being the air cool delay T7, in FIG. 20.

The cooling cycle timer T6 controls the duration of time between the end of the fusion cycle and the start of the annealing cycle.

The air cool delay timer T7 delays the start of the air blast from tube 109 to allow the molten fused joint to cool slightly and solidify so as not to be blasted apart by the high velocity air blast. The air cool delay timer T7 operates the air solenoid valve SV-5 in FIGS. 2 and 20.

When the cooling cycle timer T6 times out it will turn off the air solenoid valve SV-5 and start the anneal on timer T8. The anneal on timer controls the duration of the annealing cycle by turning on and off the annealing current relay CR-2 in FIGS. 19 and 20.

The fusion current is supplied by the same transformer 91 that supplies the annealing current. However, separate primary transformer taps are used for each function.

When the anneal on timer T8 times out it deenergizes the annealing current relay CR2 and starts the post cooling timer T9. When the post cooling timer times out, it energizes solenoid valve SV-2A in FIGS. 13 and 20 to rotate the cam shaft to the wire home position in FIG. 16. The shaft rotation is stopped by proximity switch PS-1.

The loop W3 is pulled out of the fusion head H as the bale B moves forward or away from the head. The machine is then ready for the next cycle.

The system then remains in the home position in FIG. 16, which is the end of the overall cycle, with the cutters, grippers and wire guides wide open after the wire and fused joint have been ejected as the fusion head moves away from the bale B.

Figure 17:
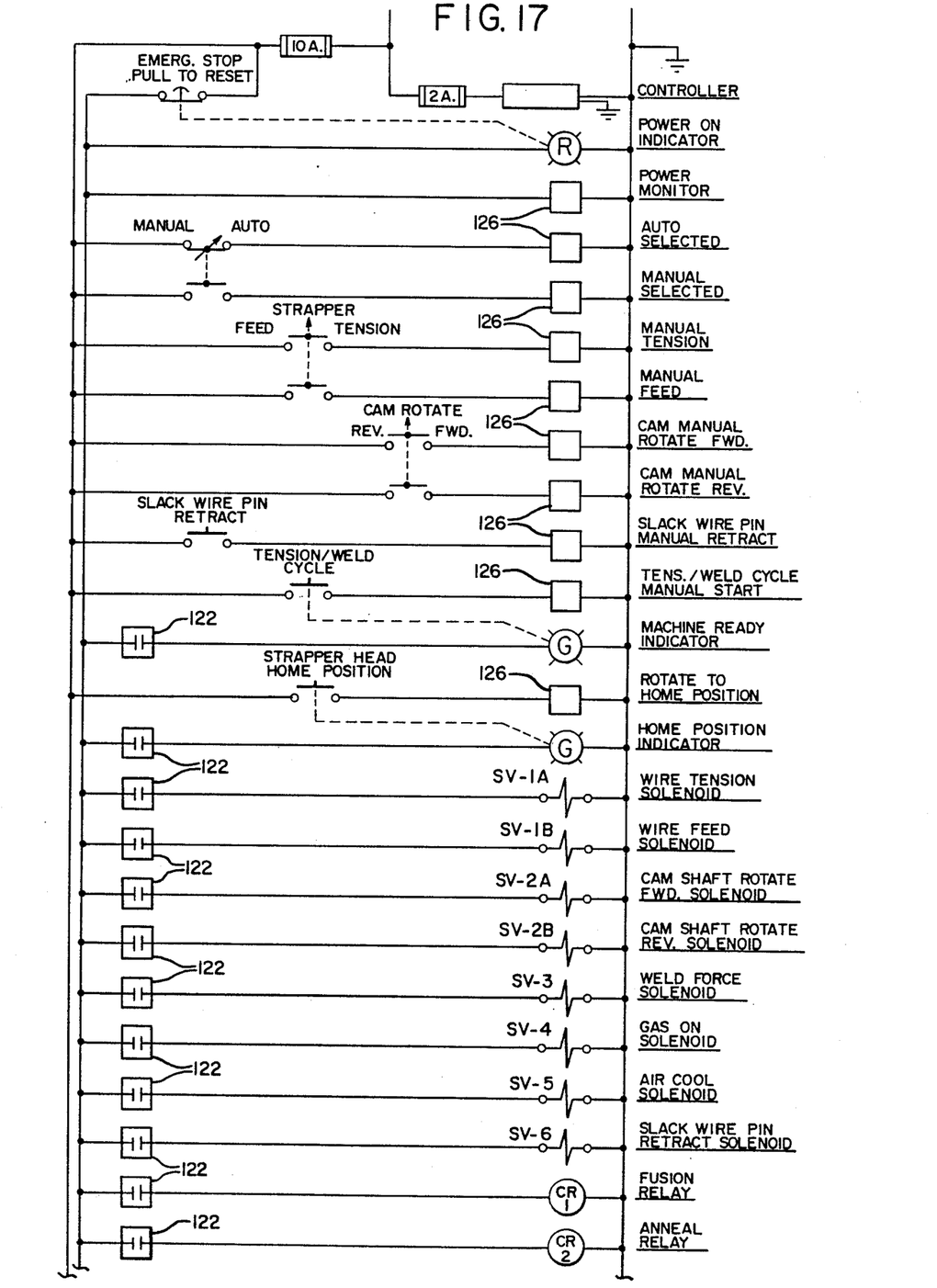
FIG. 17 and 18 are an electrical schematic drawing of the control system.
Figure 18:
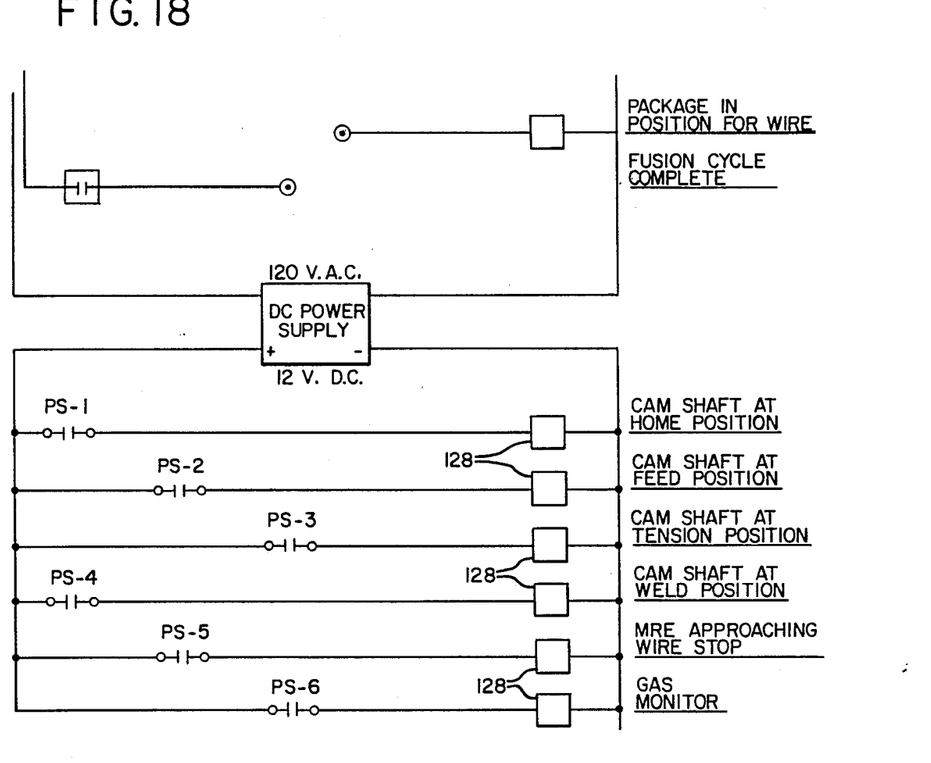

When the next bale is ready for strapping, a signal from the controller in the bale press energizes solenoid valve SV2A in FIG. 17 to rotate cam shaft 20 until it is stopped in feed position in FIG. 16 by proximity switch PS2 in FIGS. 16 and 18. When the cycles illustrated in FIG. 16 are repeated and cam shaft 20 again returns to home position.

The proximity switches function the same as physical limit switches but are actuated by the presence of magnetic material. The actuator passes by or stops next to the switch head without making physical contact therewith.

The timers referred to herein are typical timer functions from a conventional programmable solid state computer. The timers are internal of the computer. Programmable computer diagram 124 in FIG. 20 duplicates, in part, the system in FIGS. 17 and 18.

In FIG. 17 the column of boxes 126 represent inputs of the controller in the nature of relay functions from the strapping machine and other sources. In FIG. 18 the column of boxes 128 represent inputs to the controller from the designated proximity switches.

Figure 2:
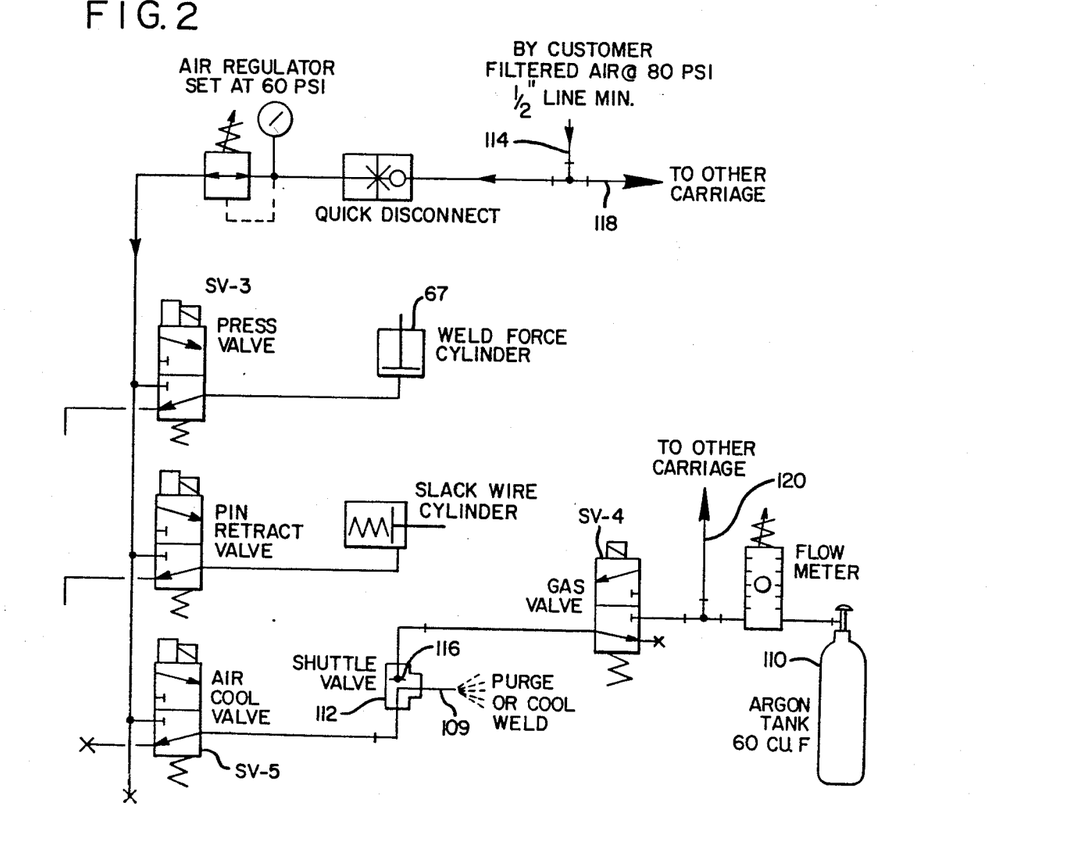
FIG. 2 is a schematic diagram of the gas and air system used in the fusion and cooling cycles in the welding operation.

FIG. 2 illustrates the gas and air system used in the fusion and cooling cycles in the welding operation described above. A supply 110 of argon or other inert gas is controlled by solenoid valve SV-4 as described in connection with FIG. 17. This valve passes the gas to a shuttle valve 112 which is also connected to an air supply 114 under the control of solenoid valve SV-5.

These gas and air connections are on opposite sides of a free floating piston 116 in the shuttle valve so that when the gas is shut off by SV-4 and the air is turned on by SV-5, as shown, piston 116 closes the gas connection and opens the air connection to the tube connection 109 described above in fusion head H. This illustrates the operation during the cooling cycle following the fusion cycle. During the fusion cycle air valve SV-5 is closed and gas valve SV-4 is open causing piston 116 to move downward and pass the gas through tube 109 and provide the inert gas environment around the fusion area as indicated at 16 in FIG. 6.

Shuttle valve 112 is positioned close to this fusion area by a short tube connection at 109 whereby any air in this tube is immediately purged when the gas is turned on by valve SV-4 and any air in tube 109 is immediately purged when air valve SV-5 is closed and gas valve SV-4 is opened. At all other times, except during the fusion cycle and during the cooling cycle, both valves SV-4 and SV5 remain closed. By making tube 109 as short as possible there is minimum waste of gas in these purging operations.

FIG. 2 includes other features not directly related to the welding operation described herein and may be disregarded. It should be noted, however, that prior U.S. Pat. Nos. 4,403,542 and 4,611,534 referred to above have two knotter carriages operating on opposite sides of the bundle on different wire loops. When these knotter mechanisms are each replaced by the present fusion head H the control system in FIG. 2 would be duplicated in the two carriages. Thus the air connection at 118 would provide an air supply for the second carriage and the gas connection at 120 would provide a gas supply for the second carriage.

FIG. 17 also contains various elements not involved in a normal welding operation and not described herein. The symbols 122 represent output signals from a conventional programmable controller.

What is claimed is:

1. The method of welding together ends of a metal band comprising bringing said ends into alignment with each other, pressing said ends into contact with each other in fusion position and turning on a flow of inert gas to apply an inert gas shield to the fusion area, applying a fusion voltage to said ends to start a fusion cycle, turning off said fusion voltage and flow of inert gas to terminate said fusion cycle, turning on a flow of cooling air directed to said fusion area to start a cooling cycle, turning off said flow of air to terminate said cooling cycle, applying an annealing voltage to said ends to start an annealing cycle, and turning off said annealing voltage to terminate said annealing cycle.

2. The method of claim 1 including using a timer to control the duration of said fusion cycle.

3. The method of claim 1 including using a timer to delay the start of said cooling cycle.

4. The method of claim 1 including using a timer to control the duration of said cooling cycle.

5. The method of claim 1 including using a timer to control the duration of said annealing cycle.

6. The method of claim 1 including using a nozzle to apply said inert gas and cooling air.

7. The method of claim 1 including the preliminary step of cutting the band from a continuous source of supply to form one of said ends.

8. The method of claim 1 including the use of timers to control the duration of said fusion cycle, the delay of the start of said cooling cycle, and the durations of said cooling and annealing cycles.

9. A machine for welding together ends of a metal band comprising means for bringing ends of a metal band into alignment with each other, means for pressing said ends into contact with each other in fusion position and means for turning on a flow of inert gas to apply an inert gas shield to a fusion area, means for applying a fusion voltage to said ends to start a fusion cycle, means for turning off said fusion voltage and flow of inert gas to terminate said fusion cycle, means for turning on a flow of cooling air directed to said fusion area to start a cooling cycle, means for turning off said flow of air to terminate said cooling cycle, means for applying an annealing voltage to said ends to start an annealing cycle, and means for turning off said annealing voltage to terminate said annealing cycle.

10. The machine of claim 9 including a timer to control the duration of said fusion cycle.

11. The machine of claim 9 including a timer to delay the start of said cooling cycle.

12. The machine of claim 9 including a timer to control the duration of said cooling cycle.

13. The machine of claim 9 including a timer to control the duration of said annealing cycle.

14. The machine of claim 9 including a nozzle to apply said inert gas and cooling air.

15. The machine of claim 9 including a cutter for cutting the band from a continuous source of supply to form one of said ends.

16. The machine of claim 9 including timers to control the duration of said fusion cycle, the delay of the start of said cooling cycle, and the durations of said cooling and annealing cycles.

* * * * *

UNITED STATES PATENT AND TRADEMARK OFFICE
CERTIFICATE OF CORRECTION

PATENT NO. : 4,785,154
DATED : November 15, 1988
INVENTOR(S) : JACK M. MOODY

It is certified that error appears in the above-identified patent and that said Letters Patent are hereby corrected as shown below:

Col 5, line 24 "W2", second occurrence, should be -- W1 --.

Col 6, line 24, "When" should be -- Then --.

Signed and Sealed this

Fourteenth Day of March, 1989

Attest:

DONALD J. QUIGG

*Attesting Officer*  *Commissioner of Patents and Trademarks*